[11] 3,573,512

[72] Inventors Maurice O. Lawson;
Hans J. P. von Ohain, Dayton; John A. Decaire, Fairborn, Ohio; Frank L. Wattendorf, Washington, D.C.
[21] Appl. No. 16,102
[22] Filed Mar. 3, 1970
[45] Patented Apr. 6, 1971
[73] Assignee The United States of America as represented by the Secretary of the Air Force

[54] ELECTROFLUID DYNAMIC GENERATOR SYSTEM
6 Claims, 8 Drawing Figs.

[52] U.S. Cl. .................................................. 310/10
[51] Int. Cl. .................................................. H02m 3/00
[50] Field of Search .......................................... 310/10, 11

[56] References Cited
UNITED STATES PATENTS
3,225,225  12/1965  Wattendorf et al. ........... 310/6
3,465,180  9/1969  Von Ohain et al. ........... 310/11

Primary Examiner—D. X. Sliney
Attorneys—Harry A. Herbert, Jr. and Richard J. Killoren ABSTRACT: In an electrofluid dynamic generator system a plurality of annularly positioned nozzles directing high velocity flow of charged particles toward a collector structure wherein the charges are moved against the electrostatic field by fluid dynamic energy. Vortex chambers are located on each side of the flow with low molecular weight gas forming aerodynamic walls for the conversion section. Electrodes are positioned in the vortex flow to provide a linear increase in voltage along the centerline of the conversion section. The electrodes are shaped so they do not interfere substantially with the vortex flow in the vortex chambers.

Patented April 6, 1971

INVENTORS
MAURICE O. LAWSON, HANS J. P. Von OHAIN
JOHN A. DECAIRE, FRANK L. WATTENDORF
BY Harry A. Herbert Jr.
ATTORNEY Richard J. Killoren
AGENT Patented April 6, 1971
3,573,512
7 Sheets-Sheet 6
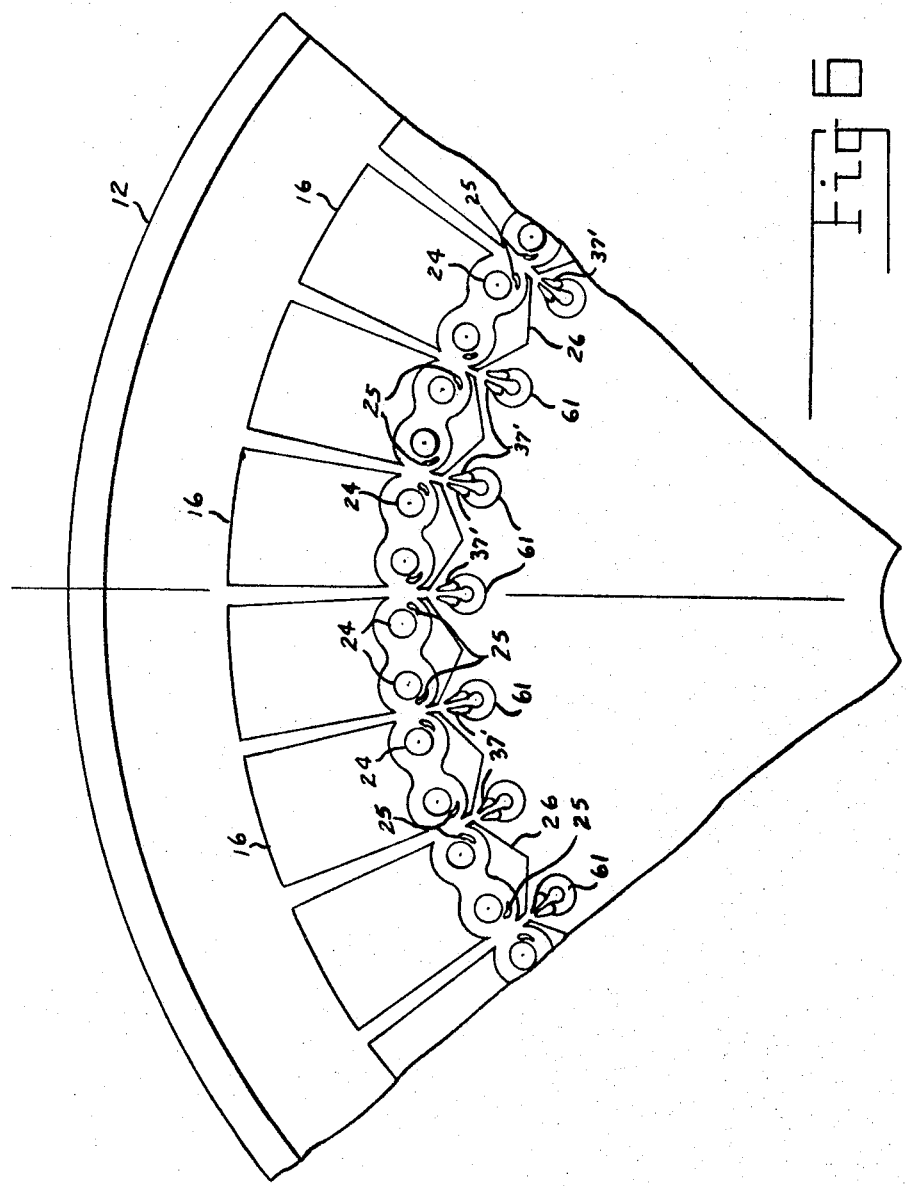
INVENTORS
MAURIC O. LAWSON, HANS J.P. Von OHAIN,
JOHN A. DECAIRE, FRANK L. WATTENDORF
BY Harry A. Herbert Jr
ATTORNEY
Richard J Killoren
AGENT Patented April 6, 1971
3,573,512
7 Sheets-Sheet 7
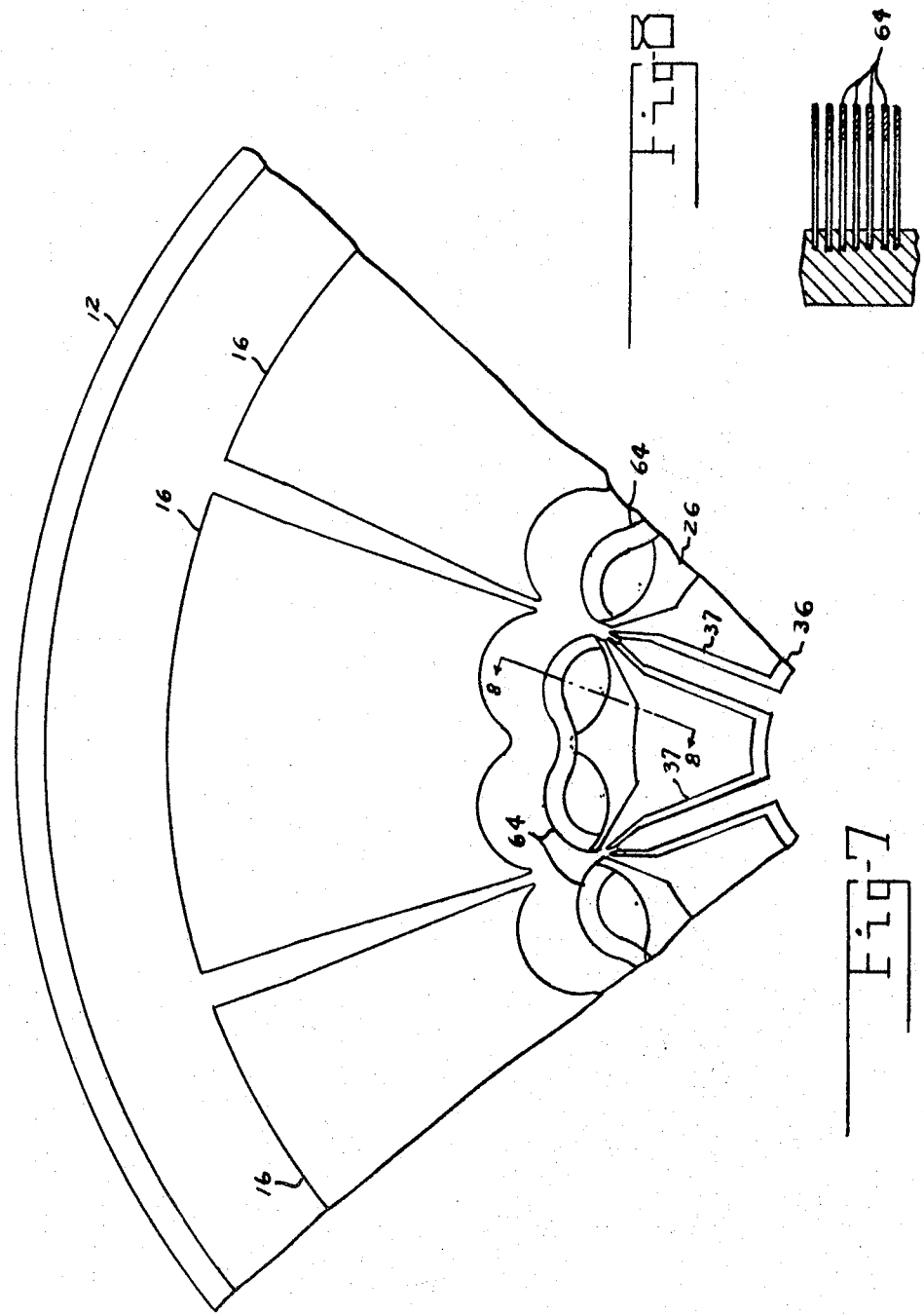
INVENTORS
MAURICE O. LAWSON, HANS J.P. Von OHAIN,
JOHN A. DECAIRE, FRANK L. WATTENDORF
BY Harry A. Herbert Jr.
ATTORNEY
Richard J. Killoren
AGENT 3,573,512

ELECTROFLUID DYNAMIC GENERATOR SYSTEM

BACKGROUND OF THE INVENTION

In systems for converting fluid dynamic energy into electrical power a gas or vapor is used to transport charges against the action of an electrostatic field. Charged particles of one polarity are transported by fluid dynamic energy from the entrance electrode to a collector electrode against the electrostatic field which is generated by the electrical potential of the collector electrode.

In prior art systems dielectric insulators are used in the walls bordering the electric charge flow which is a serious cause of electrical losses, premature leakage and surface breakdown with irreversible damage to the dielectric material.

SUMMARY OF THE INVENTION

According to this invention the conversion section is designed to eliminate the need for loss-producing insulating walls. Aerodynamic walls, in the form of round vortices in the recirculating passage are substituted for the insulating walls normally provided.

The electrodes are located near the conversion section with a novel arrangement which provides a linear increase of voltage along the centerline of the conversion section. The electrode shapes combine optimum voltage scheduling with minimum aerodynamic flow losses.

The conversion sections are located in an annular array, which close on themselves, thus making insulators unnecessary except at the end structure.

IN THE DRAWING

FIG. 6 shows another embodiment of the device of FIGS. 1—3 with a modified system for supplying fluid to the nozzles;

FIG. 7 shows a further embodiment of the device of FIGS. 1—3 with a modified field-shaping electrode system; and FIG. 8 is an enlarged sectional view of the field-shaping electrode system of FIG. 7 along the line 8—8.

DESCRIPTION OF THE INVENTION

Figure 1:
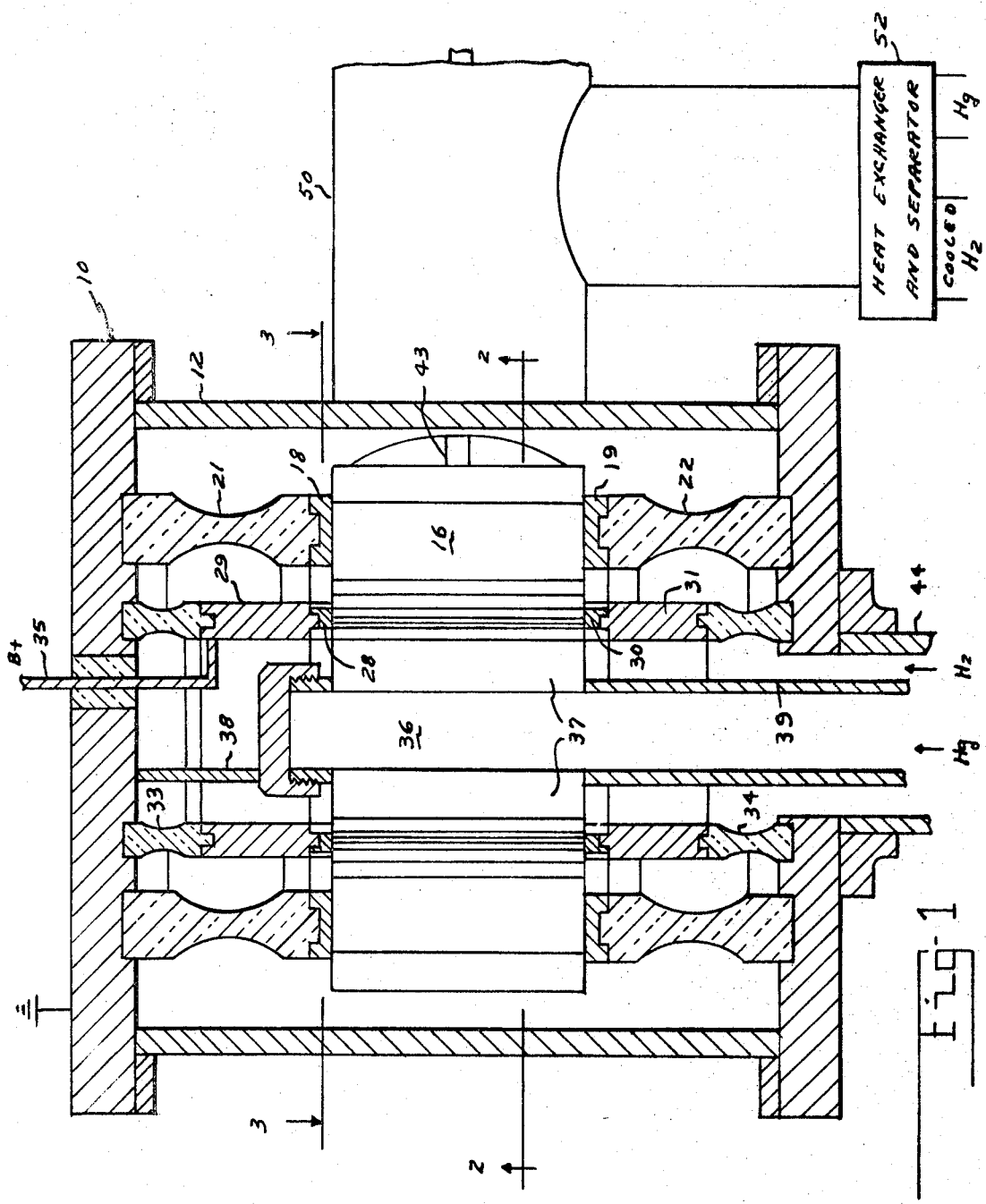
FIG. 1 is a partially schematic sectional view of an electrofluid dynamic generator according to the invention.
Figure 2:
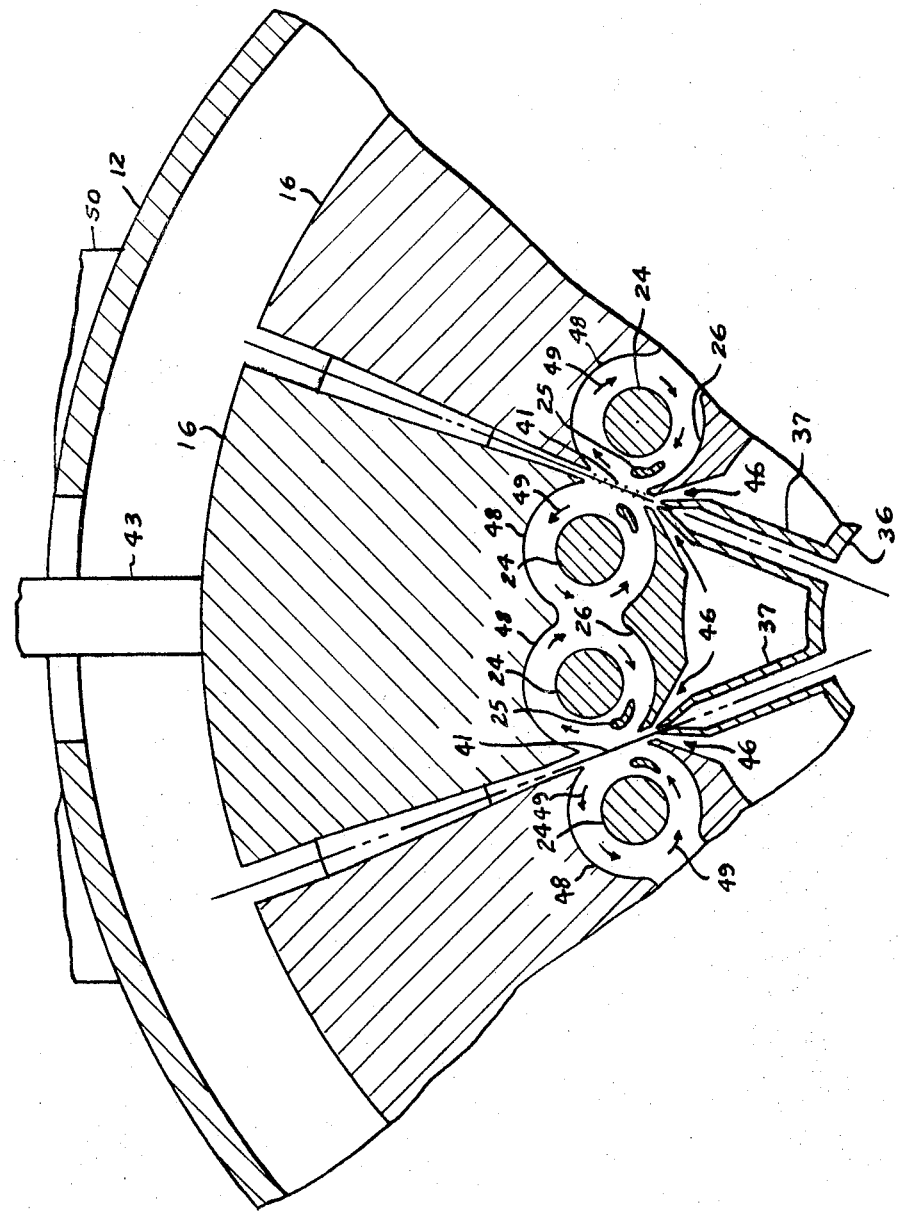
FIG. 2 is an enlarged partially cutaway sectional view of the device of FIG. 1 along the line 2—2.
Figure 3:
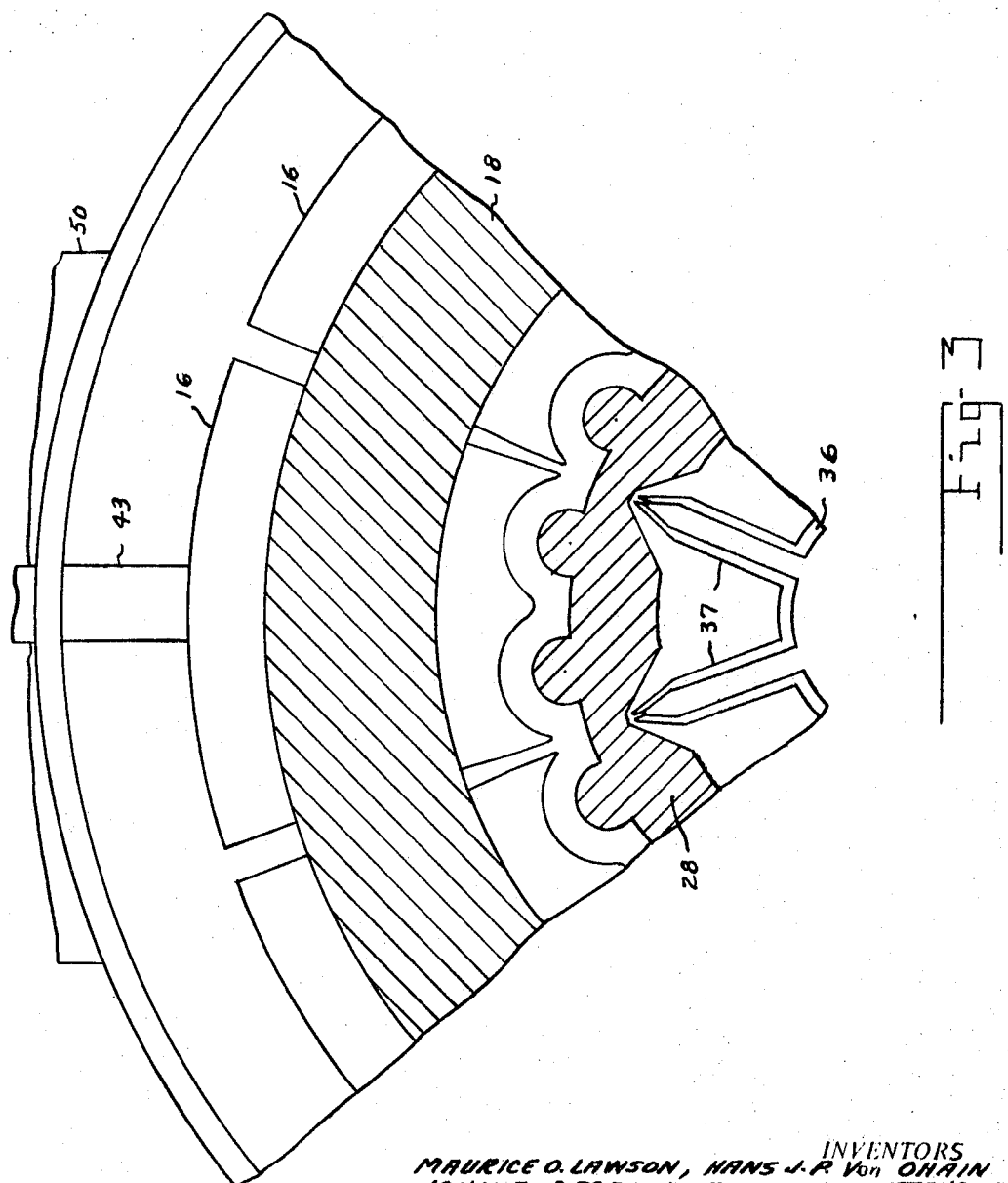
FIG. 3 is an enlarged partially cutaway sectional view of the device of FIG. 1 along the line 3—3.

Reference is now made to FIG. 1 of the drawing which shows an electrofluid-dynamic generator 10 having a pressure chamber 12. The collector electrode structure 16 shown in greater detail in FIG. 2 is electrically interconnected by means of annular connectors 18 and 19 which are supported on annular insulators 21 and 22. Field-shaping electrodes 24, 25, and 26 are electrically interconnected by annular connectors 28, 29, 30, and 31 which are supported on annular insulators 33 and 34. The field-shaping electrodes are connected at a positive potential by lead 35.

Figure 4:
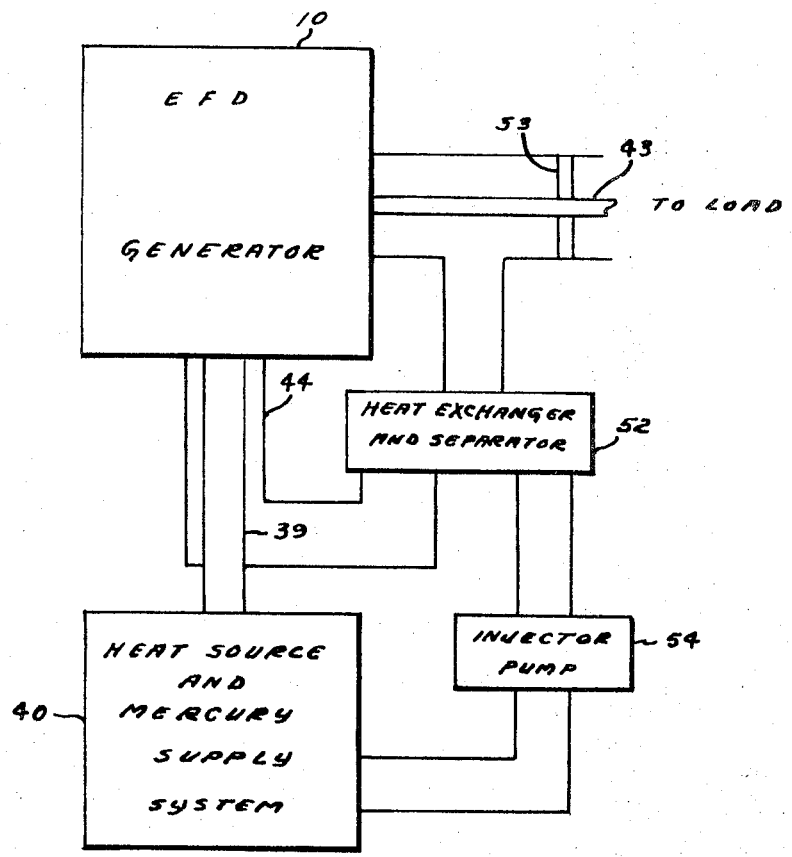
FIG. 4 is a schematic block diagram showing the electrofluid dynamic generator of the invention with a conventional fluid supply and separation system.
Figure 5:
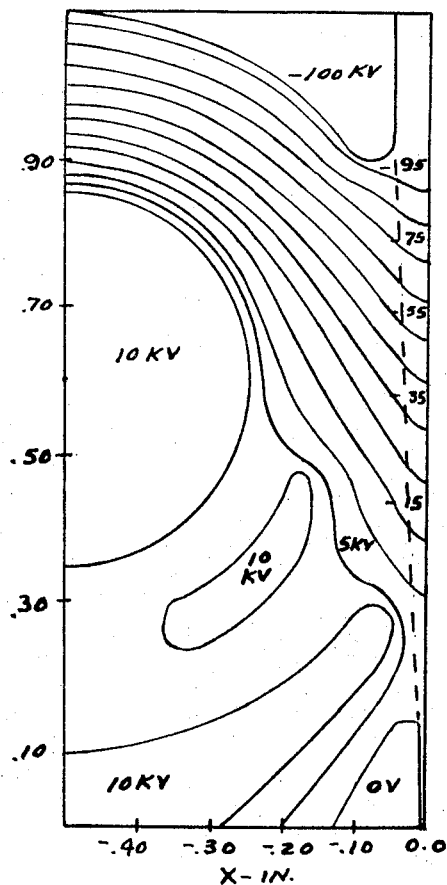
FIG. 5 is an electric field plot for the conversion system of the invention.

The nozzle assembly 36 has a plurality of annularly positioned elongated nozzles 37 secured thereto. The nozzle assembly is electrically connected by lead 38 to chamber 12 which is connected at ground potential. A work medium such as mercury vapor at a pressure of from 20 to 400 atmospheres is supplied to the nozzle assembly 36 through input tube 39 from a heat source and supply system 40 shown in FIG. 4. The working fluid is charged either by contact charging, corona ionization, or other well-known means. If corona ionization is used, corona needles, not shown, would be supplied at the tip of the nozzles 37. The charged particles are transported through the conversion section 41 by fluid dynamic energy against the field generated by the electrical potential of the collector electrode. The charges on the collector electrode are neutralized by current flowing in an external load circuit, not shown, connected to output 43. A low molecular weight gas, such as hydrogen, enters input tube 44 and passes out between electrodes 26 and the nozzles 37 as shown at 46 and forms an aerodynamic wall on the sides of the primary flow in conversion section 41. A portion of this gas flows in the vortex chambers 48. The electrodes 16, 24, 25, and 26 are shaped to provide recirculating vortex passages. The electrodes 24, 25, and 26 provide a linear increase in voltage along the centerline of the conversion section 41 as shown in FIG. 5. The working medium and entrained low molecular weight gas, after passing through the collector structure, pass out through conduit 50 surrounding output electrode 43 to a heat exchanger and separator 52 where the mixture is cooled and separated in the conventional manner. Though an insulting seal 53 is shown in FIG. 4 such an insulator is not needed if the conduit 50 leads to another pressurized system. The hydrogen is returned to input tube 44 and the mercury vapor is returned to mercury supply 40 by means of an injector pump 54 in the conventional manner. Thermodynamic energy is supplied to the mercury in the heat source and supply system 40 which converts the mercury to a high pressure mercury vapor.

In the operation of the device, a high temperature gas or vapor is supplied to the nozzles 37 through input tube 39. The spray leaving the nozzles 37 is charged by contact charging. The charged gas or vapor is carried toward the collectors 16 by fluid dynamic energy as in other electrofluid-dynamic generators. The low-molecular weight secondary flow gas enters tube 44 and passes between nozzles 37 and electrodes 26 and passes along the sides of the main flow from nozzles 37. A portion of this gas flows in vortex chambers 48 as shown by the arrows 49. A portion of low-molecular weight gas is entrained in the working medium and passes through the collector structure with the working medium. The low-molecular weight gas is cooled in the heat exchanger 52 and after separation is returned to input tube 44. The mecury vapor is condensed in the heat exchanger and separator 52 and returned to the mercury supply 40 by an injector pump 54.

While a single input tube is provided for all the nozzles 37 in the device thus far described, separate tubes 61 could be provided for each nozzle 37' as shown in FIG. 6 thus permitting the use of a greater number of units. The other structure is the same as in FIGS. 1—4.

Also the vortex chambers may be as shown in FIGS. 7 and 8, wherein the field-shaping structure consists of a plurality of spaced plates 64 attached to electrode 26. The spacing between the plates permits the vortex flow in the vortex chambers 48.

While the devices shown all have the conversion sections located in an annular array, they could be located in a linear array with insulation being provided at the end of the structures outside the conversion sections. However, since insulators sometimes cause breakdown problems, the annular array is preferred since fewer insulators are required.

Although a closed system wherein the work medium and low molecular weight gas are recycled is disclosed, open systems may be used wherein the work medium is vented to the environment under some conditions and with some work mediums.

Also, although a pressure range of 20 to 400 atmospheres has been described, it is to be understood that higher pressures can be used to advantage if apparatus is built to withstand the higher pressures.

There is thus provided an electrofluid-dynamic generator which provides improved voltage scheduling and makes the use of insulators in the conversion section unnecessary.

We claim:

1. An electrofluid-dynamic energy conversion system comprising:
   a closed chamber;
   a plurality of elongated nozzle electrodes within said chamber;

a collector electrode array within said chamber spaced from said nozzle array;

insulating support means, for supporting said collector electrode array within said chamber;

means for supplying a high pressure gaseous material to said nozzle electrodes to thereby provide a flow of gaseous material toward said collector electrode array;

means for ionizing the gas leaving said nozzles whereby charged particles of one polarity are driven toward the collector by fluid dynamic energy;

a substantially cylindrical shaped vortex chamber positioned adjacent each side of the flow of gas between the nozzles and the collector electrode array;

means for supplying a secondary flow of low-molecular weight gas on each side of the gas flow between the nozzles and the collector array whereby a recirculating vortex flow is generated in said vortex chambers;

means including field-shaping electrodes positioned within said vortex chambers for providing a linear increase of voltage along the centerline of the flow between the nozzles and the collector array; and insulating support means for supporting said field-shaping electrodes within said closed chamber and output means connected to said collector array.

2. The device as recited in claim 1 wherein said nozzles, collector electrodes and vortices are located in an annular array within said closed chamber.

3. A device as recited in claim 1 wherein said means for supplying high pressure gaseous material to the nozzles includes a central supply tube; each of said nozzles being connected to said central supply tube.

4. A device as recited in claim 1 wherein said means for supplying high pressure gaseous material to the nozzles includes a separate supply tube connected to each of the nozzles with the nozzles and supply tubes being located in an annular array.

5. The device as recited in claim 1 wherein said means for providing a linear increase in voltage includes electrodes positioned on both sides of the gas flow forming one wall of said vortex chambers; an elongated cylindrical electrode centrally positioned within each vortex chamber; at least one vane type electrode positioned between each cylindrical electrode and the vortex-chamber-forming electrodes and having one edge substantially on the tangent line, of said cylindrical electrodes, which intersects the end of the vortex-chamber-forming electrodes adjacent the gas flow.

6. The device as recited in claim 1 wherein said means for providing a linear increase in voltage includes electrodes positioned on both sides of the gas flow forming one wall of said vortex chambers; a plurality of spaced plate members attached to the vortex-chamber-forming electrodes and having curved edges extending into said vortex chambers.